United States Patent [19]

Poitras

[11] 4,101,055

[45] Jul. 18, 1978

[54] COLORANT DISPENSER HAVING TIME SEQUENCE DISPENSING CYCLE

[76] Inventor: Edward J. Poitras, 198 Highland St., Holliston, Mass. 01746

[21] Appl. No.: 712,328

[22] Filed: Aug. 6, 1976

[51] Int. Cl.$^2$ .............................................. B67D 5/30
[52] U.S. Cl. ..................................... 222/17; 141/104; 141/125; 222/70
[58] Field of Search ................. 417/397; 222/135, 309, 222/334, 372, 148, 330, 70, 38, 14, 16, 17; 141/89, 105, 125, 280

[56] References Cited

U.S. PATENT DOCUMENTS

| | | | |
|---|---|---|---|
| 1,809,813 | 6/1931 | Kantor | 222/309 |
| 2,979,233 | 4/1961 | Smith et al. | 222/135 |
| 3,125,252 | 3/1964 | Heiss et al. | 222/148 X |
| 3,180,527 | 4/1965 | Wasilewski et al. | 222/334 X |
| 3,231,136 | 1/1966 | Rotter et al. | 222/334 X |
| 3,239,100 | 3/1966 | Peterson | 222/135 X |
| 3,897,888 | 8/1975 | Grau | 222/38 |

FOREIGN PATENT DOCUMENTS

| | | | |
|---|---|---|---|
| 796,968 | 4/1936 | France | 222/309 |
| 672,196 | 5/1952 | United Kingdom | 222/330 |

Primary Examiner—Robert B. Reeves
Assistant Examiner—David A. Scherbel
Attorney, Agent, or Firm—John E. Toupal

[57] ABSTRACT

Disclosed is a machine including a plurality of containers for a variety of paint colorants and a plurality of measuring receptacles, one connected for fluid communication with each of the containers. A cyclic pumping system simultaneously pumps metered volumes of colorant into predetermined measuring receptacles from their associated containers during a withdrawal cycle and then dispenses the metered volumes during a discharge cycle. Adjustment of selector mechanisms associated with each measuring receptacle provides the exact quantities of colorant required to formulate a specific volume of a desired paint color. A cycle timer establishes a uniform time period for each of the sequential withdrawal and dispensing cycles regardless of the colorant quantities being dispensed and a sequence timer can be preset to provide the number of sequential withdrawal and dispensing cycles required to formulate paint volumes that are a given multiple of the specific volume.

13 Claims, 6 Drawing Figures

COLORANT DISPENSER HAVING TIME SEQUENCE DISPENSING CYCLE

BACKGROUND OF THE INVENTION

This invention relates generally to apparatus for dispensing and combining metered quantities of different fluids and, more specifically, to a machine for selectively dispensing colorants used to formulate paints of various color.

In the interest of limiting costly inventories, most retail stores formulate many paint colors at the time of purchase rather than stocking all available colors. The formulation is accomplished by adding specified quantities of colorant tints to a white base paint so as to create the specific color desired. Typically, paints are formulated with apparatus including a plurality of colorant filled containers and pumping mechanisms for withdrawing predetermined quantities therefrom. In the simplest machines of this type, a can filled with the base paint is sequentially moved to each desired colorant container and its individual pump is actuated to withdraw the desired quantity of fluid colorant. A more efficient machine of this type includes a rotary turntable on which the colorant containers are mounted and which is used to sequentially move each colorant container required for the formulation to a given discharge area occupied by the base paint filled can. Although such machines are relatively simple and inexpensive and function satisfactorily for many applications, they exhibit the disadvantage of requiring a substantial amount of attention by an operator thereby adding significiant labor cost to the paint sold. Conversely, there exist intricate automatic paint colorant machines that will dispense the various tints required for a given formulation in response to the mere insertion of a coded punch card selected by an operator. Although drastically reducing required operator time these machines are too expensive for practical use in most retail outlets and also suffer breakdowns that require complex repairs and often render them dysfunctional for extended periods of time.

The object of this invention, therefore, is to provide a semi-automatic paint colorant dispensing machine that limits required operator attention and is in addition reliable and relatively inexpensive.

SUMMARY OF THE INVENTION

The machine according to the present invention includes a plurality of containers for a variety of paint colorants and a plurality of measuring receptacles, one connected for fluid communication with each of the containers. A cyclic pumping system simultaneously pumps metered volumes of colorant into predetermined measuring receptacles from their associated containers during a withdrawal cycle and then dispenses the metered volumes during a discharge cycle. Adjustment of selector mechanisms associated with each measuring receptacle provides the exact quantities of colorant required to formulate a specific volume of a desired paint color. A cycle timer establishes a uniform time period for each of the sequential withdrawal and dispensing cycles regardless of the colorant quantities being dispensed and a sequence timer can be preset to provide the number of sequential withdrawal and dispensing cycles required to formulate paint volumes that are a given multiple of the specific volume.

In a preferred embodiment of the invention the pumping system comprises a power piston and cylinder assembly associated with each of the containers and the receptacles are formed by dispensing cylinders having outlets communicating with nozzles in a nested array. Dispensing pistons in the dispensing cylinders are mechanically coupled to the power pistons so as to be reciprocative therewith. The selector mechanisms comprise adjustable stops that selectively limit the strokes of the mechanically coupled together power and dispensing pistons thereby establishing desired measuring volumes in the dispensing cylinders. These volumes are filled during withdrawal strokes by the power piston and the resultant measured volumes of colorant are discharged from the nested nozzles during the power pistons' discharge strokes. The tandem arrangement of power and dispensing cylinders greatly simplifies the automatic measurement and dispensing of fluid volumes.

According to one feature of the invention a lost motion coupling allows a small initial movement by each power piston that is not experienced by its associated dispensing piston. The lost motion allows a dispensing piston to remain motionless in the event that the applied hydraulic force causes a slight elongation of an associated power cylinder and a resultant inadvertent motion of a fully stopped power piston. In the absence of the lost motion, such inadvertent motion of a power piston could prompt the discharge of a small quantity of undesired colorant. To accommodate the lost motion, an elongated scale forming the selector is provided with a plurality of uniformly spaced graduations representing given increments of movement by the power piston and an initial pair of more widely spaced graduations represent the given increment of movement plus the lost motion of the power piston.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
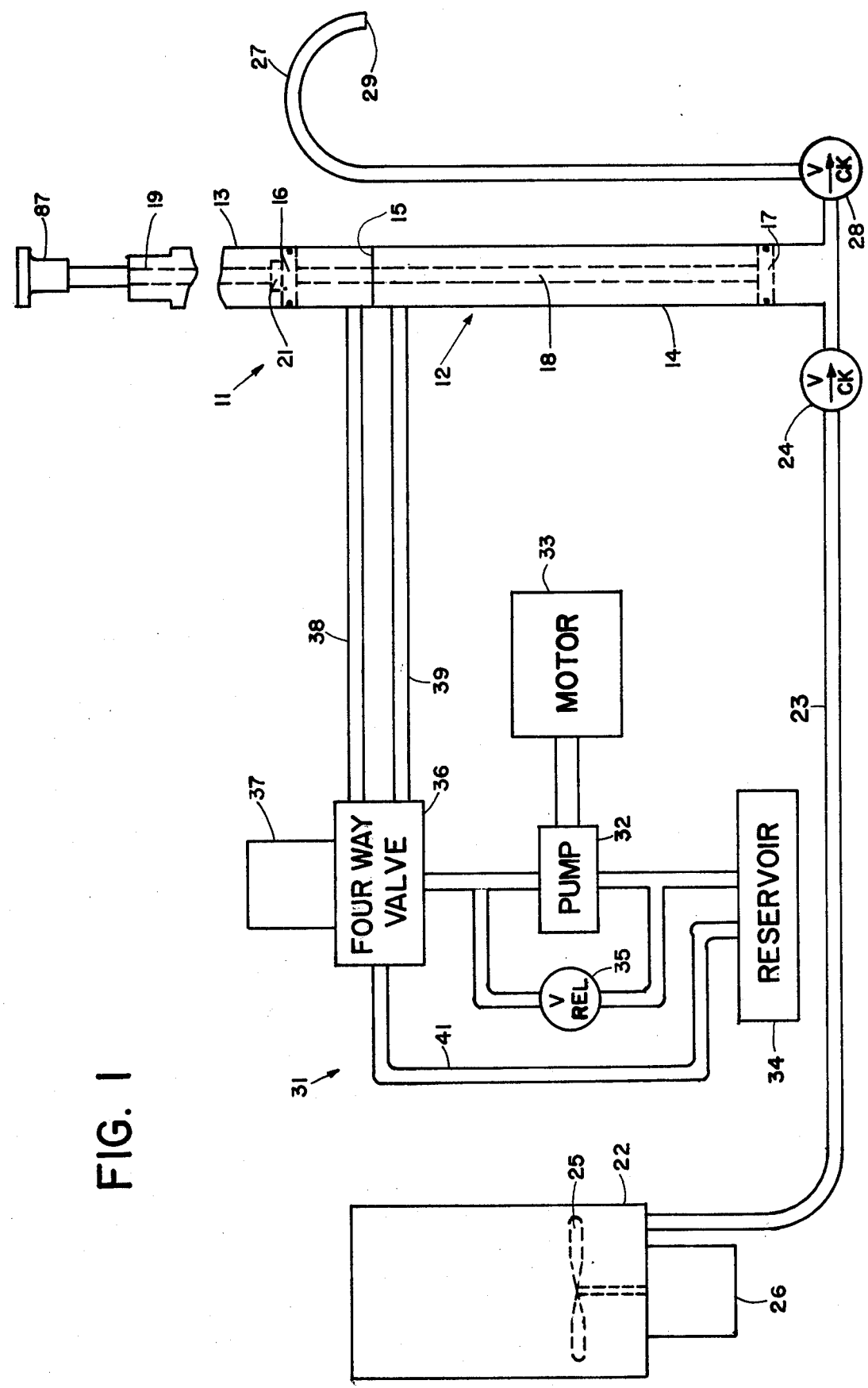
FIG. 1 is a schematic drawing illustrating one module of a paint colorant dispensing machine according to the invention.

Referring now to FIG. 1 there is shown a dispensing module 11 including a tandemly arranged power and dispensing cylinder assembly 12. The assembly 12 includes an upper power cylinder 13 and a lower dispensing cylinder 14 separated by a divider wall 15. Reciprocatively mounted in the power cylinder 13 is a power piston 16 coupled to a dispensing piston 17 in the cylinder 14 by a connecting rod 18 that extends through the divider wall 15. Also slidably received within the power cylinder 13 is a selector scale 19 terminating at its lower end with a shoulder stop 21 that limits upward movement of the power piston 16. Further details of the power and dispensing cylinder assembly 12 are described below in connection with FIGS. 5 and 6.

The dispensing cylinder 14 is connected for fluid communication with a container 22 by an inlet tube 23 including an inlet check valve 24. When in use the container 22 is filled with a fluid colorant of the type employed for tinting paints. The fluid medium retained by the container 22 can be agitated by a stirrer 25 driven by a motor 26. Also in fluid communication with the dispensing cylinder 14 is an outlet tube 27 that includes an outlet check valve 28 and terminates with a discharge nozzle 29. It should be noted that a complete colorant dispensing machine according to the invention includes a plurality of the dispensing modules 11, one for each colorant desired. The discharge nozzles 29 for all such modules are nested in a common discharge area as described hereinafter in connection with FIGS. 3 and 4.

A single hydraulically powered pumping system 31 powers dispensing operations for all the modules 11 of a machine. The system 31 includes an hydraulic pump 32 that is driven by a motor 33. The pump 32 draws hydraulic fluid from a reservoir 34 and is bypassed by a relief valve 35. Receiving hydraulic fluid supplied by the pump 32 is a four-way valve 36 that is controlled by a solenoid 37. A tube 38 permits circulation of hydraulic fluid between the valve 36 and the lower end of the power cylinder 13 while a tube 39 permits circulation of fluid between the valve 36 and the upper end of the dispensing cylinder 14. The hydraulic circulation system is completed by a return tube 41 that extends between the exhaust outlet of the valve 36 and the reservoir 34. As described in greater detail below, the module 11 selectively withdraws predetermined volumes of colorant from the container 22 and discharges those volumes out of the nozzle 29. The precise volumes discharged are controlled by the selector limit means 19 which also is described in greater detail below.

Figure 2:
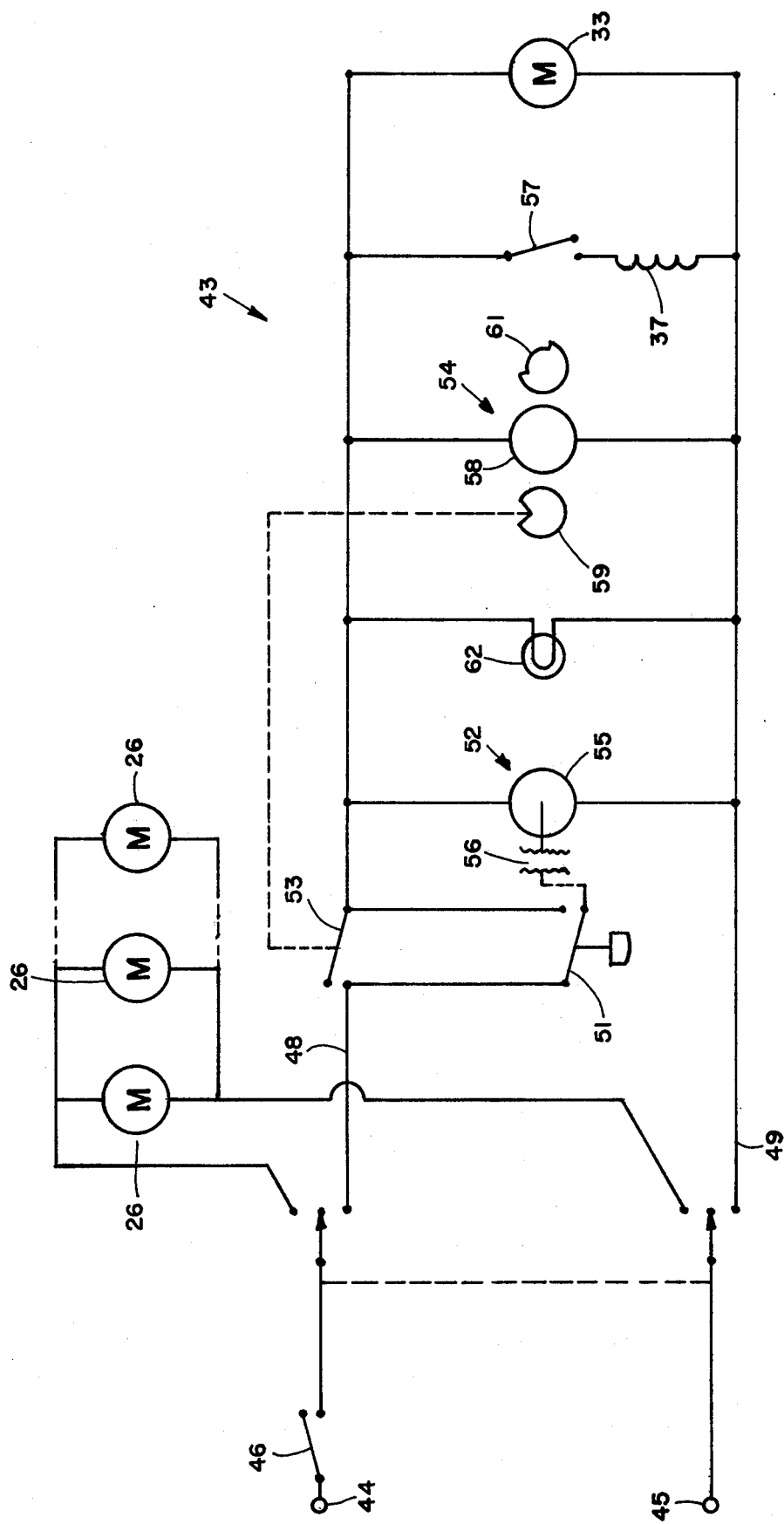
FIG. 2 is a schematic circuit diagram of an electrical control system for the machine shown in FIG. 1.

Referring now to FIG. 2 there is shown an electrical system 43 for controlling the operation of the dispensing module 11 shown in FIG. 1. The system 43 has a pair of terminals 44, 45 for connection to a suitable source of electrical power and a safety switch 46 for energizing the system. Connected to the terminals 44 and 45 is a two-pole on-off switch 47, having one on position that energizes the stirring motors of all modules in the system and a second on position that provides power to the bus lines 48 and 49 of the circuit 43. Connected in parallel in the line 48 are a momentary start-up switch 51 controlled by a sequence timer 52 and a switch contact 53 controlled by a cycle timer 54. The sequence control timer 52 includes a synchronous clock timer 55 that is connected across the lines 48 and 49 and can be set to provide a given period of actuation of a clutch 56 that maintains the switch contact 51 in a closed position. Also connected between the lines 48 and 49 by a switch contact 57 is the solenoid 37 that controls the four-way valve 36 shown in FIG. 1. The cycle timer 54 also has a synchronous clock timer 58 connected between the lines 48 and 49 and mechanically coupled to a pair of timing cams 59 and 61. The cam 59 is operatively coupled to the switch contact 53 which it maintains closed during the major portion of each revolution of the clock timer 58 while the cam 61 is operatively coupled to the switch contact 57 which it maintains in closed position for approximately one half of each revolution of the clock timer 58. Also connected across the lines 48 and 49 is an indicator light 62 and the motor 33 for the hydraulic pump 32 shown in FIG. 1.

When using the machine an operator examines an instruction manual to determine the amounts and types of colorant required to formulate a given amount of a desired paint color. Next, the module associated with each required colorant is set to provide the necessary quantity. Assuming, for example, that the colorant retained by the container 22 (FIG. 1) is required for the formulation, the selector rod 19 is set so as to locate the stop 21 in a position that will limit the stroke of the power piston 16 to a given length. This in turn determines the stroke length of the directly coupled dispensing piston 17 and thereby establishes which portion of the dispensing cylinder 14 will function as a measuring receptacle during a dispensing cycle. After closure of the switch 46 (FIG. 2), in a manner described below, the switches 47 and 51 are closed to simultaneously energize the timers 55 and 58, the signal light 62 and the pump motor 33. Energization of the timer 55 actuates the clutch 56 to maintain the switch contact 51 closed for the predetermined time period for which the timer 55 has been set. At the same time energization of the motor 33 activates the hydraulic pump 32 (FIG. 1) which pumps hydraulic fluid through the hydraulic system 31. In its initial position the valve 36 conveys hydraulic fluid through the tube 38 into the power cylinder 13 producing a withdrawal stroke in which the power piston 16 is forced up against the stop 21. Corresponding upward movement of the dispensing piston 17 creates in the dispensing cylinder 14 a vacuum that draws fluid colorant from the container 22 through the feed line 23 and the inlet check valve 24. After one-half revolution of the clock timer 58 (FIG. 2), the cam 61 closes the switch contact 57 to energize the solenoid 37. This actuates the valve 36 into a position connecting the inlet to the tube 39 and the tube 38 to the exhaust line 41. Consequently hydraulic fluid is pumped into the dispensing cylinder 14 forcing the dispensing piston 17 downwardly to expel the previously drawn-in colorant through the outlet valve 28 and into the tube 27. This produces from the nozzle 29 the discharge of a predetermined volume of colorant established by the original setting of the selector rod 19. During this dispensing cycle by the module 11 all other modules associated with required colorants simultaneously dispense volumes determined by the settings of their selector rods. It should be noted that the clock timer 58 is selected so as to provide cycle periods of sufficient length to accommodate the maximum possible strokes of the power and dispensing pistons 16 and 17.

Assuming that only a single dispensing cycle is desired the sequence timer 55 would not have been set to delay opening of momentary start-up switch 51. Consequently upon completion of a single revolution by the timer 58, the cam 59 will have reached its initial position to open the switch contact 53 to thereby deenergize the circuit 43. However, if the quantity of paint being formulated is a certain multiple of the given volume for which the selector settings were made, an appropriate number of additional dispensing cycles can be provided automatically by selective adjustment of the sequence timer 52. For example, if the instruction manual provides selector settings for formulating a pint of paint, eight dispensing cycles would be required to formulate a gallon of paint. Accordingly, the sequence timer 52 is set for a time period equal to the period required for seven and one-half revolutions by the cycle timer 58. In this case, a complete revolution of the cycle timer 58 does not deenergize the circuit 43 in that the sequence timer 55 maintains the clutch 56 activated to hold closed the switch contacts 51. Accordingly, the cycle timer 58 continues to rotate and produce sequential dispensing cycles in the manner described above. Only after seven and one-half dispensing cycles have been completed does the sequence timer 52 de-activate the clutch 56 and open the contacts 51. After the desired eight dispensing cycles the cam 59 opens the switch 53 to terminate operation. Obviously any other desired number of dispensing cycles can be automatically obtained by appropriate settings of the sequence timer 55. Furthermore, once the machine has been set to formulate a given sized can of a desired color, additional cans can be prepared by merely re-activating the start switch 51.

Figure 4:
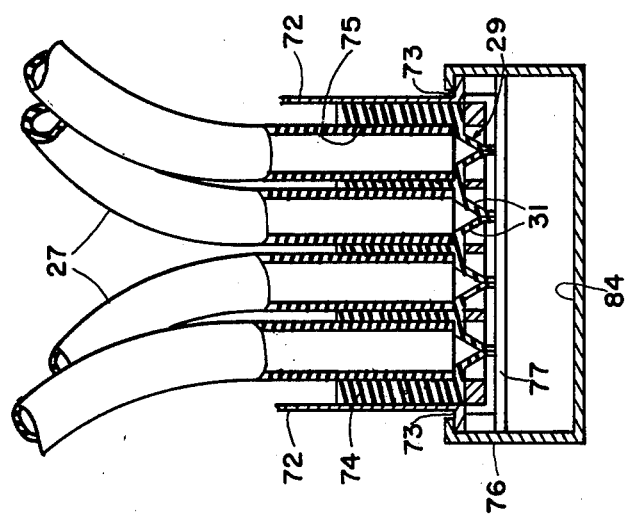
FIG. 4 is a cross-sectional view taken along lines 4—4 in FIG. 3.
Figure 3:
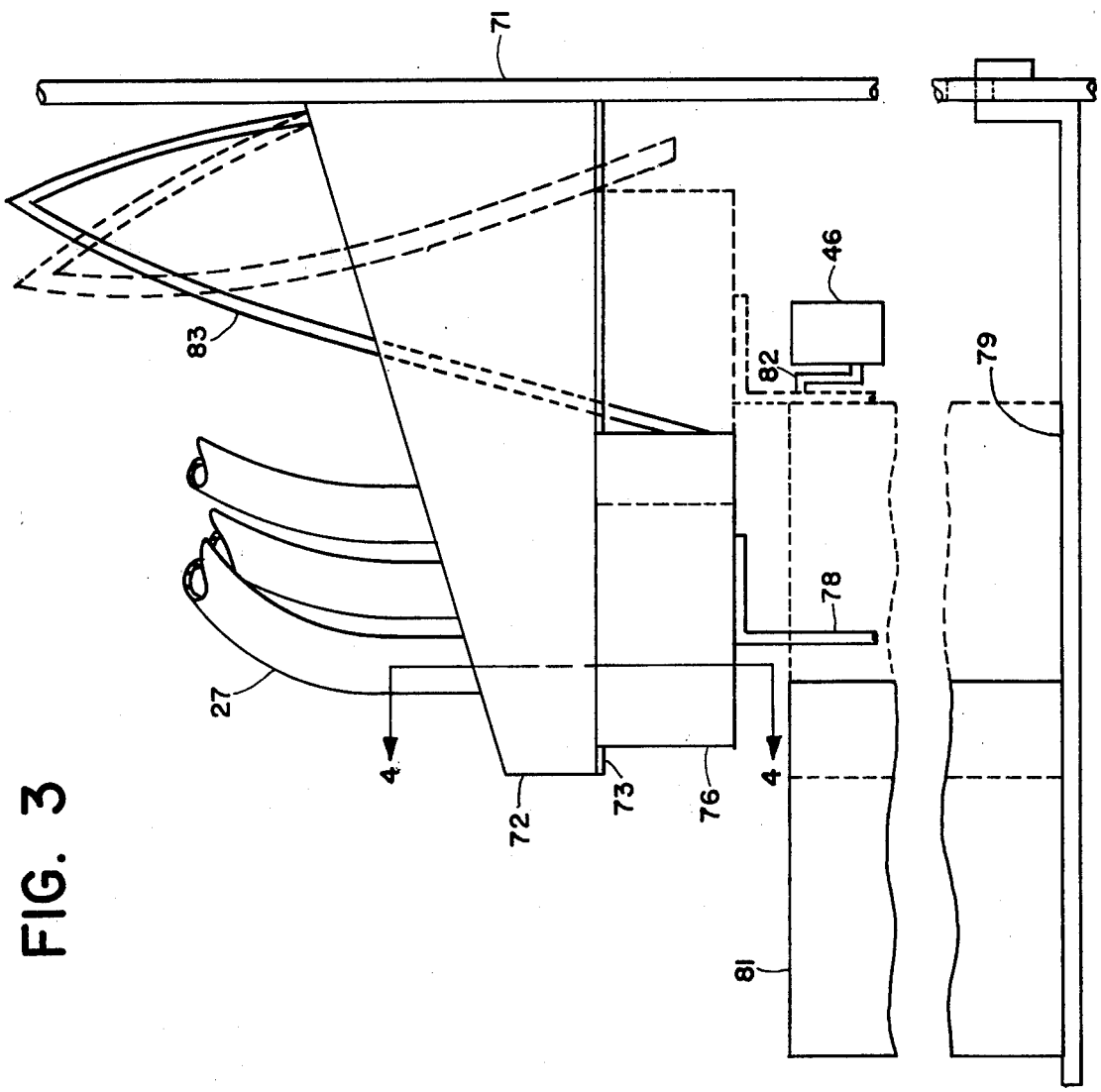
FIG. 3 is a side elevational view of a discharge assembly for a machine having a plurality of the dispenser modules shown in FIG. 1.

Referring now to FIGS. 3 and 4 there is shown an assembly for accommodating collection of the fluid colorants dispensed by a plurality of the modules 11 shown in FIG. 1. Extending from a base 71 are a pair of support brackets 72 with lower edges defined by outwardly extending flanges 73. Supported between the brackets 72 is a molded nest 74 having an array of bores 75 for receiving the tubes 27 from the modules 11. The nest 74 includes a plurality of resilient cups 29, one located at the bottom of each of the bores 75. Each of the resilient cups 29 include a pair of separable flaps 31 that can be forced apart by fluid pressure to provide nozzle openings from the tubes 27. Slidably retained by the flanges 73 is a cup 76 that supports a transverse wire 77 aligned with the bottom edges of the nozzle cups 29. Also supported by the bottom surface of the cup 76 is a downwardly extending bracket 78. Located below the nest 74 and removably retained by the base 71 is a shelf 79 for accommodating a paint can 81. Also mounted on the base 71 is the switch 46 shown in FIG. 2 and having an actuator arm 82.

When preparing for a dispensing operation of the type described above, an opened paint can 81 is placed upon the shelf 79 and slid rearwardly to the position directly below the nested nozzles 29 as shown by dotted lines in FIG. 3. During its rear movement onto the shelf 79, the can 81 engages the bracket 78 moving it rearwardly to the position also shown by dotted lines in FIG. 3. In that position, the bracket 78 engages the arm 82 to close the switch 46 and energize the circuit 43 (FIG. 2). Furthermore, during rearward movement of the cup 76 the transverse wire 77 contacts the bottom edges of all the nozzles 29 thereby automatically wiping therefrom any excess fluid colorant that may have inadvertently oozed out of the tubes 27 after the preceding dispensing cycle. Upon completion of all the dispensing cycles programmed by the sequence timer 52, the can 81 is removed from the shelf 79 and a leaf spring 83 supported by the base 71 returns the cup 76 to its forward position. During this forward movement of the cup 76 the nozzles 29 are again wiped by the wiper wire 77 to remove therefrom any externally retained colorant. Any drops of colorant removed by the wiper wire 77 fall harmlessly onto the bottom surface 84 of the cup 76. The height of the shelf 79 is adjustable so as to accommodate paint cans of different size such that any can inserted will engage the bracket 78 and produce the nozzle wiping and circuit energization operations described above.

Figures 5, 6:
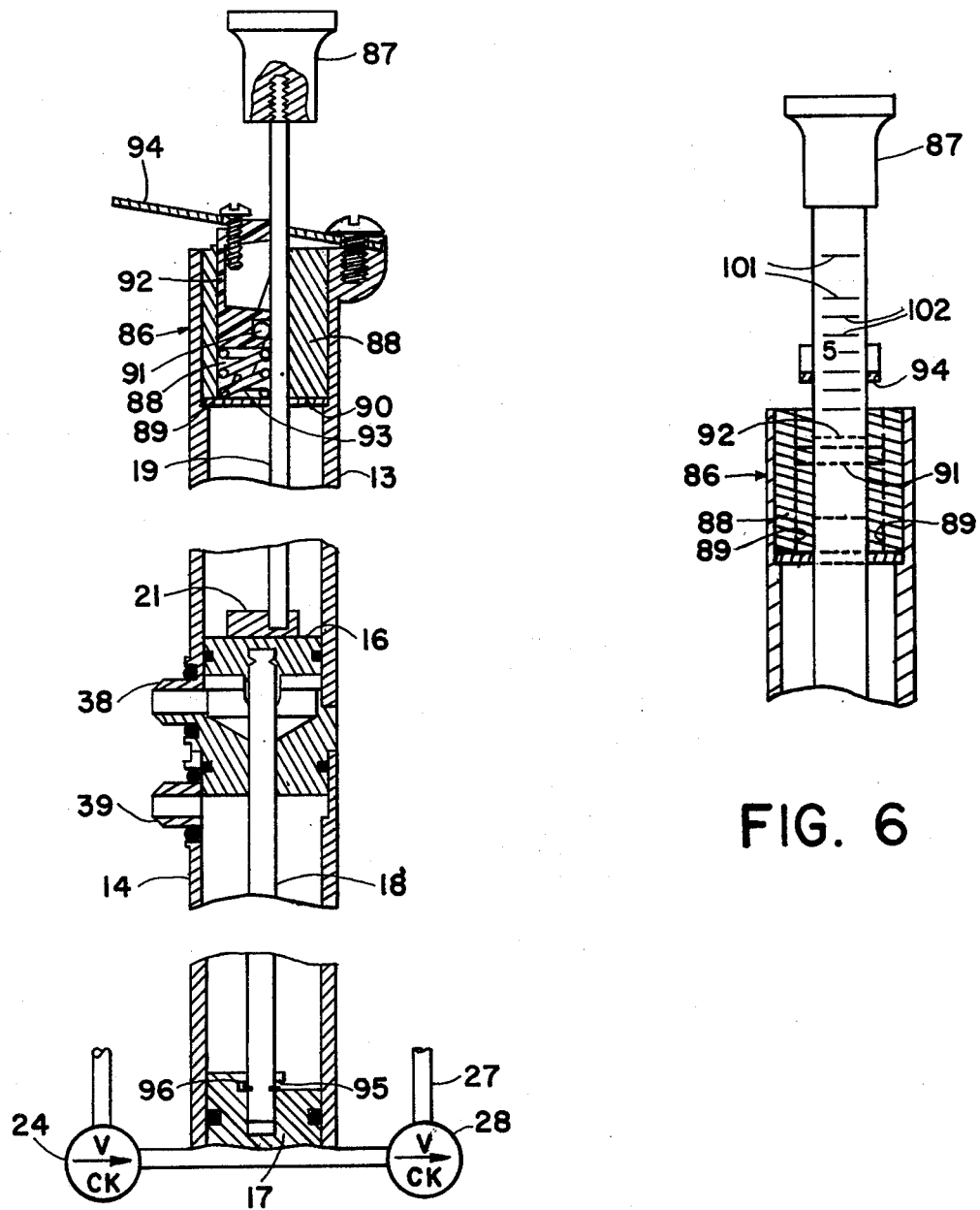
FIG. 5 is a detailed cross-sectional view of the tandem power and dispensing cylinders shown in FIG. 1.
FIG. 6 is a partial sectional view taken long lines 6—6 in FIG. 5.

Referring now to FIG. 5 there are shown further details of the dispensing module 11 shown in FIG. 1. The selector rod 19 extends through a lock mechanism 86 and terminates with a handle 87 that can be used to position the stop 21 at any longitudinal location within the power cylinder 13. The lock mechanism 86 includes a shell 88 supported by an annular washer 90. Defined by the inner surface of the shell 88 are spaced apart grooves 89 that are inclined toward the selector scale 19 and accommodate a retaining roller 91. The roller 91 is retained by a slot in a button 92 that is biased upwardly by a compression spring 93 so as to force the roller 91 against the selector rod 19 and thereby prevent movement thereof. Mounted on the cylinder 13 is a lever 94 that can be pressed to force the button 92 downwardly. This releases the frictional binding force applied by the roller 91 and thereby permits longitudinal movement of the selector rod 19.

As shown in FIG. 5, the dispensing piston 17 includes a central recess 95 through which the connecting rod 18 extends. Movement of the dispensing piston 17 in response to movement of the connecting rod 18 is caused by engagement of a snap ring 96 with opposite surfaces of the recess 95. Because of the lost motion provided by the recess 95 and the ring 96 initial movement of the power piston 16 is not accompanied by movement of the dispensing piston 17 until the ring 96 engages the upper surface of the recess 95. The purpose of the lost motion is to prevent pumping of unwanted colorant in response to an inadvertent elongation of the cylinder 13. Such elongation could be caused during a withdrawal cycle in any dispensing module set not to dispense as shown in FIG. 5. Hydraulic pressure against the power piston 16 would produce a force that would be transmitted through the stop 21, the rod 19 and the lock mechanism 86 as a tension on the cylinder 13. Any resultant elongation of the cylinder would move the stop 21 upwardly and permit corresponding movement of the power piston 16. Consequently, a small undesired quantity of colorant would be discharged during the subsequent dispensing cycle.

To compensate for the lost motion, the scale rod 19 is provided with an additional pair of graduations 101 (FIG. 6) that are spaced apart by a distance somewhat greater than the uniform distances separating all other graduations 102. It will be obvious that the uniform spacing between the graduations 102 represents given increments of movement by the tandemly coupled power and dispensing pistons 16 and 17. The slightly greater spacing between the initial graduations 101 compensates for the independent additional movement of the power piston 16 permitted before engagement of the snap ring 96 with the upper surface of the recess 95. Because of this lost motion the amount of dispensing piston movement provided by the more widely spaced initial graduations 101 is exactly the same as that provided by any pair of the uniformly spaced graduations 102.

Obviously, many modifications and variations of the present invention are possible in light of the above teachings. For example, the described and claimed dispenser apparatus could be used other than as described in any application in which metered quantities of fluid mediums are to be dispensed. It is to be understood, therefore, that the invention can be practiced otherwise than as specifically described.

What is claimed is:

1. A fluid dispenser apparatus comprising:

container means for a fluid medium to be dispensed;

an hydraulic power system comprising a power cylinder, a power piston reciprocable in said power cylinder, a circulation system for circulating hydraulic fluid so as to produce reciprocative motion of said power piston, and pump means for pumping hydraulic fluid through said circulation system;

nozzle means for dispensing said medium;

a dispensing cylinder having an inlet communicating with said container means and an outlet communicating with said nozzle;

a dispensing piston disposed in said dispensing cylinder and coupled with said power piston so as to be reciprocative therewith;

inlet and outlet valve means for controlling the flow of said medium between said container, said dispensing cylinder and said nozzle during intake and discharge strokes of said dispensing piston;

lost motion means for rendering said dispensing piston nonresponsive to initial motion of said power piston during an intake stroke; and adjustable limit means movable from a stop position in which movement of said dispensing piston is prevented to positions permitting strokes of known length by said dispensing piston so as to effect discharge through said nozzle of preselected volumes of said medium, said adjustable limit means comprising scale means for determining the preselected volume of said medium to be discharged and including a plurality of systematically spaced graduations representing given increments of movement by said power piston and an initial pair of more widely spaced graduations representing said given increment of movement plus the initial independent motion of said power piston produced by said lost motion means.

2. A fluid dispenser apparatus according to claim 1 wherein said circulation system comprises valve means providing hydraulic fluid flow into said power cylinder during an intake stroke of said dispensing piston and into said dispensing cylinder during a discharge stroke thereof.

3. A fluid dispenser apparatus according to claim 2 wherein said limit means is disposed to limit the intake stroke length of said dispensing piston by limiting motion of said power piston.

4. A fluid mixing and dispensing apparatus comprising:

a plurality of containers for fluid mediums to be combined;

a plurality of measuring receptacles, each defining a variable effective volume and one connected for fluid communication with each of said containers;

tubulation means for conveying fluid medium retained in said effective volume of each of said receptacles to a discharge nozzle, all of said nozzles being disposed in a common discharge area;

cyclic pump means for pumping preselected volumes of fluid medium from said containers to said receptacles during sequential withdrawal cycles and from said receptacles to said discharge area during sequential dispensing cycles;

an adjustable selector means for selectively and independently varying the effective volume of each of said receptacles, and wherein said pump means completely fills said effective volume of each receptacle during said withdrawal cycles to establish the preselected volume of fluid medium pumped from each of said containers to said receptacles;

cycle timer means for controlling the periods of said sequential withdrawal and dispensing cycles; and sequence control means adjustable to provide a predetermined number of said sequential withdrawal and dispensing cycles, said sequence control means comprising sequence timer means for deenergizing said cyclic pump means after a time period encompassing a predetermined number of said sequential withdrawal and dispensing cycles.

5. A fluid mixing and dispensing apparatus according to claim 4 wherein said receptacles comprise dispensing cylinders, said pump means comprises hydraulically powered dispensing pistons reciprocative therein, and said volume control means comprise adjustable limit means for independently limiting the strokes of each of said dispensing pistons.

6. A fluid mixing and dispensing apparatus according to claim 5 wherein said dispensing pistons are coupled with said power pistons so as to be reciprocative therewith.

7. A fluid mixing and dispensing apparatus according to claim 6 wherein said limit means are disposed to limit the strokes of said dispensing pistons by limiting the strokes of said power pistons.

8. A fluid mixing and dispensing apparatus according to claim 7 including lost motion means for rendering said dispensing pistons nonresponsive to initial motion of said power pistons.

9. A fluid mixing and dispensing apparatus according to claim 8 including shelf means adjacent said discharge area for supporting a vessel in a position to receive fluid medium discharged from all of said discharge nozzles and wiper means for automatically wiping all of said discharge nozzles in response to movement of a vessel onto said shelf means.

10. A fluid mixing and dispensing apparatus comprising:

a plurality of containers for fluid mediums to be mixed;

tubulation means for conveying fluid medium from each of said containers to a discharge nozzle, all of said nozzles being disposed in a common discharge area;

cyclic pump means for sequentially pumping preselected volumes of fluid medium from said containers to said nozzles during a dispensing cycle;

a selector means for each of said containers, each of said selector means being adjustable to establish the preselected volume of fluid medium pumped from each of said containers to said nozzles during said dispensing cycle;

shelf means adjacent said discharge area for supporting a vessel in a position to receive fluid medium discharged from all of said discharge nozzles; and wiper means for automatically wiping all of said discharge nozzles in response to movement of a vessel onto said shelf means.

11. A fluid mixing and dispensing apparatus according to claim 10 wherein said wiper means comprises re-wiper means for automatically wiping all of said discharge nozzles in response to removal of a vessel from said shelf means.

12. A fluid mixing and dispensing apparatus according to claim 11 wherein said wiper means comprises wiper surface means mounted for reciprocative movement along a path in which it engages all of said nozzles, said wiper surface means being disposed so as to be engaged and moved along said path in one direction by a vessel moving onto said shelf means, and bias means for moving said surface means in the opposite direction in response to removal of the vessel from said shelf means.

13. A fluid mixing and dispensing apparatus according to claim 10 including electrical switch means for activating said cyclic pump means, said timer means and said program control means in response to positioning of a vessel on said shelf means.

* * * * *